United States Patent [19]

Takanabe et al.

[11] Patent Number: 4,571,684
[45] Date of Patent: Feb. 18, 1986

[54] MAP DISPLAY SYSTEM FOR VEHICLES

[75] Inventors: Kazunori Takanabe, Kasugai; Masaki Yamamoto, Nagoya; Kenzo Ito, Okazaki; Hiroshi Fujinami, Anjo, all of Japan

[73] Assignee: Nippondenso Co., Ltd., Kariya, Japan

[21] Appl. No.: 592,842

[22] Filed: Mar. 23, 1984

[30] Foreign Application Priority Data

Mar. 25, 1983 [JP] Japan .................. 58-49956

[51] Int. Cl.⁴ ............................. G06F 15/50
[52] U.S. Cl. ...................... 364/449; 364/424; 364/521; 353/12; 343/451; 340/990; 340/995; 73/178 R
[58] Field of Search .............. 364/424, 443, 444, 449, 364/521; 353/11, 12; 343/450–453; 73/178 R; 340/988–990, 992, 995, 996

[56] References Cited

U.S. PATENT DOCUMENTS

| 4,086,632 | 4/1978 | Lions | 364/521 |
| 4,312,577 | 1/1982 | Fitzgerald | 353/12 |
| 4,400,727 | 8/1983 | Aron | 340/995 |
| 4,484,192 | 11/1984 | Seitz et al. | 364/449 |
| 4,504,913 | 3/1985 | Miura et al. | 364/424 |
| 4,511,973 | 4/1985 | Miura et al. | 364/424 |
| 4,513,377 | 4/1985 | Hasebe et al. | 364/424 |
| 4,527,155 | 7/1985 | Yamaki et al. | 340/990 |

Primary Examiner—Gary Chin
Attorney, Agent, or Firm—Cushman, Darby & Cushman

[57] ABSTRACT

In a map display system for vehicles, spot coordinates are preliminarily stored which represent map forming spots and are provided with a coordinate origin of a specified spot, and display coordinates indicating map changing frames are also preliminarily stored. The display coordinate of the present position of the vehicle is compared with the display coordinate of a map changing frame. When the present position reaches the map changing frame, the spot coordinate of the present position is compared with the preliminarily stored spot coordinates so as to extract spots forming a new map centering the present position of the vehicle.

6 Claims, 18 Drawing Figures

| (x1,y1) \ (x2,y2) | O | I | II | III | IV | V | VI | VII | VIII |
|---|---|---|---|---|---|---|---|---|---|
| O | × | × | × | × | ○ | ○ | × | ○ | ○ |
| I | × | × | × | ○ | ○ | ○ | ○ | ○ | ○ |
| II | × | × | × | ○ | ○ | × | ○ | ○ | × |
| III | × | ○ | ○ | × | ○ | ○ | × | ○ | ○ |
| IV | ○ | ○ | ○ | ○ | ○ | ○ | ○ | ○ | ○ |
| V | ○ | ○ | × | ○ | ○ | × | ○ | ○ | × |
| VI | × | ○ | ○ | × | ○ | ○ | × | × | × |
| VII | ○ | ○ | ○ | ○ | ○ | ○ | × | × | × |
| VIII | ○ | ○ | × | ○ | ○ | × | × | × | × |

MAP DISPLAY SYSTEM FOR VEHICLES

The present invention relates to map display systems for vehicles and more particularly to a map display system for vehicles which is so designed that the present position of a vehicle can be confirmed easily while ensuring a reduced map data storage capacity.

In a known type of map display system in which the present position of a vehicle is displayed on a map displayed on a display while computing the present position of the vehicle in accordance with signals from a heading sensor and a distance sensor, if a display map changing is effected only when a present position display point reaches one side of the display screen, it becomes difficult to confirm the whereabouts of the present position on the displayed map when the present position display point reaches near to one side on the map. Also, the storage capacity for the map data as a whole increases inevitably.

In other words, the conventional system prepares map data for each of adjacent areas so that when the vehicle comes to the next or adjacent area, the map is replaced with that of the adjacent area thus automatically updating the map and thus the present position is not necessarily centered even if the map of the adjacent area is displayed. Also, the maps of the adjacent areas for map updating purposes are fixed and therefore the freedom of map selection is decreased.

With a view to overcoming the foregoing deficiencies in the prior art, it is an object of the present invention to provide a map display system for vehicles which is designed to ensure a reduced map data storage capacity and preliminarily prepare map data for a large area whereby when the vehicle reaches an adjacent area, the required map data for the current area centering the present position is extracted from the map data of the large area and a new map is produced.

To accomplish the above object, in accordance with the invention there is provided a map display system of the type in which the present position of a vehicle is displayed on a map displayed on the screen of a display by computing the present position of the vehicle as it moves, the system comprising a map data storage medium preliminarily storing spot coordinates of map forming spots with a specified spot as a coordinate origin, storage means preliminarily storing map changing frame indicative display coordinates, means for comparing the display coordinates of the present position with the display coordinates of a map changing frame, means whereby upon determination of the comparing means that the present position has reached the map changing frame the spot coordinates of the present position or an expected present position are compared with the spot coordinates in the map data storage medium thereby extracting the spots forming a new map centering the present position or the expected present position, and means for displaying the new map on a display.

Thus, in accordance with the invention, a map centering the present position of a vehicle is produced making it possible to produce maps for immeasurable combinations of adjacent areas in accordance with the present position and increase the freedom of map selection and also the displayed map is replaced with a map centering the present position or an expected present position of the vehicle making it possible to easily grasp the present position of the vehicle.

The present invention will become more apparent from the following description taken in conjunction with the accompanying drawings, in which.

A preferred embodiment of the invention will now be described in a greater detail with reference to FIGS. 1 to 11.

Figure 1:
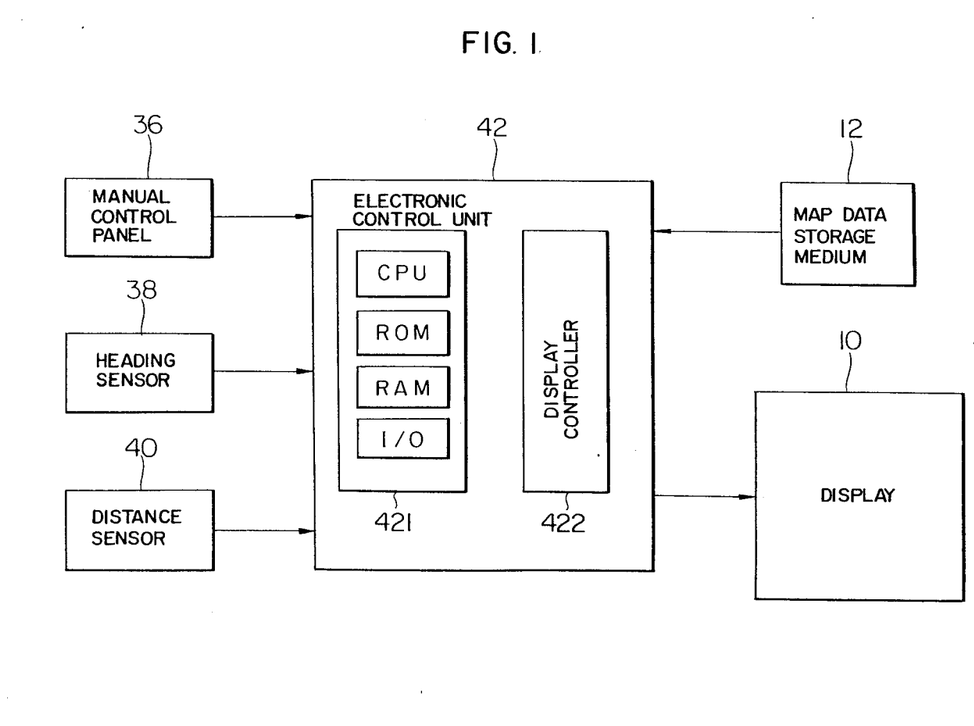
FIG. 1 is a block diagram showing the construction of an embodiment of the invention.

FIG. 1 is a block diagram of the present embodiment. In the Figure, numeral 10 designates a display including a CRT, EL display or the like for displaying a map, the present position of a vehicle, etc. Numeral 12 designates a map data storage medium including an ROM package, magnetic tape, magnetic disk, magnetic bubbles or the like and preliminarily storing map data as mentioned previously. Numeral 36 designates a manual control panel, and 38 a heading sensor of the gyro type or the like which detects the direction of movement of a vehicle, e.g., the direction of the earth's magnetic field with respect to the vehicle or the relative direction of movement of the vehicle. Numeral 40 designates a distance sensor for indirectly detecting the rotation of the speedometer cable as an electric signal by a reed switch, magnetic sensitive element or photoelectric conversion element or detecting the rotation of the output shaft of the transmission as an electric signal by the similar means as mentioned previously and supplying to an electronic control unit 42 a distance signal which is used for detecting the distance traveled by the vehicle. Numeral 42 designates the electronic control unit which includes a microcomputer 421 including a CPU, ROM, RAM and I/O device and a display controller 422 for controlling the display on the display 10.

Figure 2:
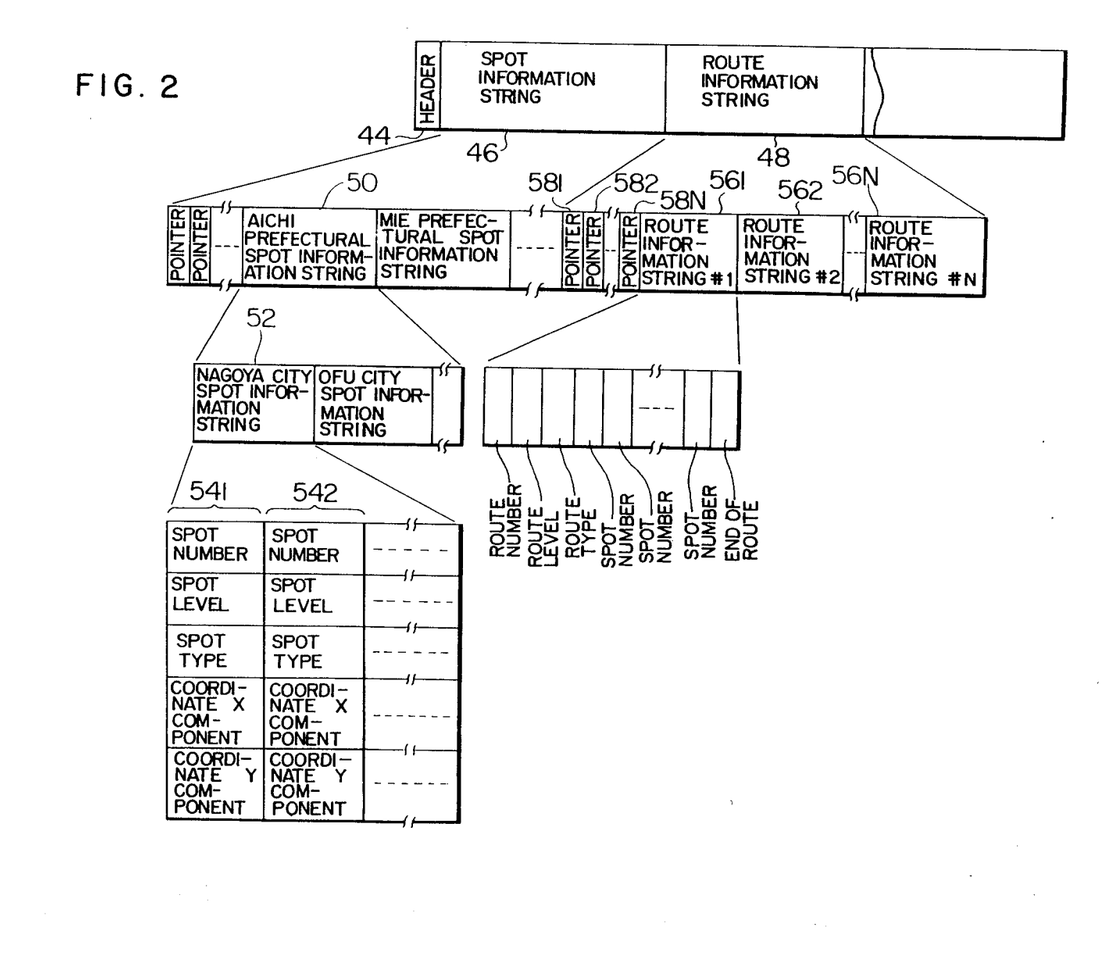
FIG. 2 is a diagram showing a data structure of map data.

As shown in FIG. 2, for example, the structure of the map data preliminarily stored in the map data storage medium 12 includes a header 44 serving as a regional map data identification symbol, a spot information string 46 relating to spots forming a relevant map and a route information string 48 relating to routes such as roads, seaside roads and railways, and the spot information string 46 includes a group of prefectural spot information strings belonging to the respective districts, such as, a spot information string 50 belonging to Aichi Prefecture. The spot information string 46 also includes plural pointers designating a top address of Aichi prefectural spot information string, Mie prefectural spot information string and so on. Each of the prefectural spot information strings, such as, the Aichi prefectural spot information string 50 includes a group of city spot information strings of cities, etc., belonging to the prefecture, e.g., a Nagoya city spot information string 52 relating to Nagoya City belonging to Aichi Prefecture. Each of the city spot information strings, e.g., the Nagoya city spot information string 52 includes a spot information string group including spot information 541, 542, . . . relating to spots belonging to Nagoya City and each of the spot information 541, 542, . . . includes a spot number, spot level, spot classification and spot coordinate X and Y components. Note that the spot level is predetermined in correspondence to a given display map scale. For example, it is predetermined so that the spot is not displayed when the reduced scale is 1/1,000,000 and the spot is displayed when the scale is enlarged to 1/500,000. Also, the spot classification indicates the characteristic feature of the spot, such as, the ordinary intersection, public highway grade separation, interchange, intersection of public highway and expressway or intersection of public highway and railway. On the other hand, the coordinate X and Y components are given as a coordinate point on a coordinate system with a specified spot as its origin as mentioned previously. The route information string 48 includes first to Nth route information strings 561, 562, . . . , 56N and pointers 581, 582, . . . , 58N having one-to-one correspondence to the former, and each of the route information strings 561, 562, . . . , 56N includes a route number, route level, route classification, spot number group of route forming spots and end of route. The route level is predetermined in correspondence to a given display map scale in the like manner as the previously mentioned spot level and the route classification represents the type of the route, such as, the national road, expressway, public highway, railway or seaside road. Also, the spot numbers have one-to-one correspondence to the previously mentioned spot numbers of the spot information strings.

Next, the processes of the electronic control unit 42, particularly the principal processes relating to the present invention will be described. Let it be assumed that a map has already been displayed on the display 10 and the electronic control unit 42 has computed the present position of a vehicle in accordance with the signals from the heading sensor 38 and the distance sensor 40 thus displaying the present position on the display 10.

Figure 3:
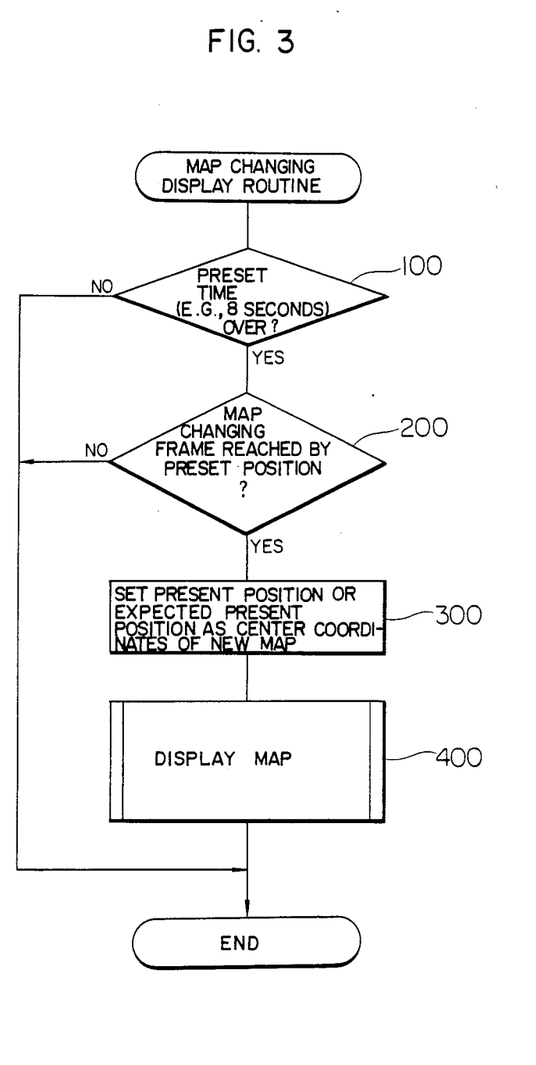
FIG. 3 is a flow chart for explaining the processing of the embodiment of FIG. 1.
Figure 4:
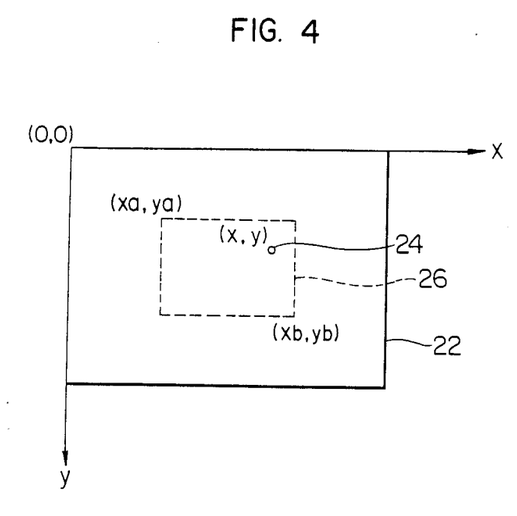
FIGS. 4, 5a and 5b are diagrams for explaining the processing of the step 300 in FIG. 3.

FIG. 3 shows a map changing display routine performed by the electronic control unit 42. In this map changing display routine, a step 100 is performed first to determine the lapse of a predetermined period of 8 seconds, for example, or a predetermined time interval for performing a process of determining whether the present position of a vehicle has reached a map changing frame. Until the time that the predetermined period is over, the decision results in NO and the routine is ended. If it is determined that the predetermined period has elapsed, then a step 200 is performed to determine whether the present position has reached the map changing frame. As shown in FIG. 4, this decision step is performed by comparing the display coordinates (x, y) of the present position with points (xa, ya) and (xb, yb) representing a map changing frame 26 preliminarily stored in the storage means, e.g., the RAM and determining whether x>xb, x<xa, y>yb or y<ya thereby determining whether the present position has reached the map changing frame 26. If the present position has not reached the map changing frame 26, the routine is just ended. On the contrary, if it is determined that the present position has reached the map changing frame 26, then a step 300 is performed thus performing a process of placing the present position or an expected present position at the center of a new map.

Figure 5A:
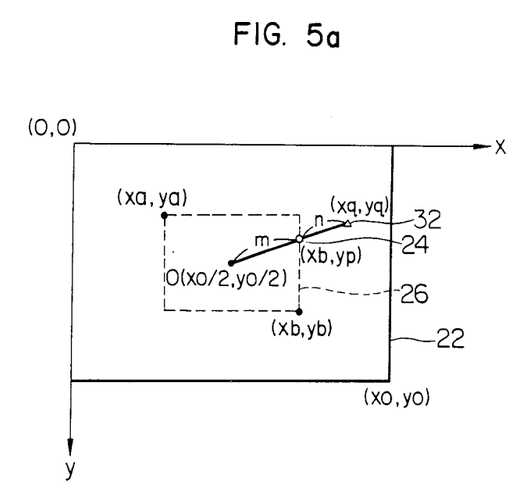
Figure 5B:
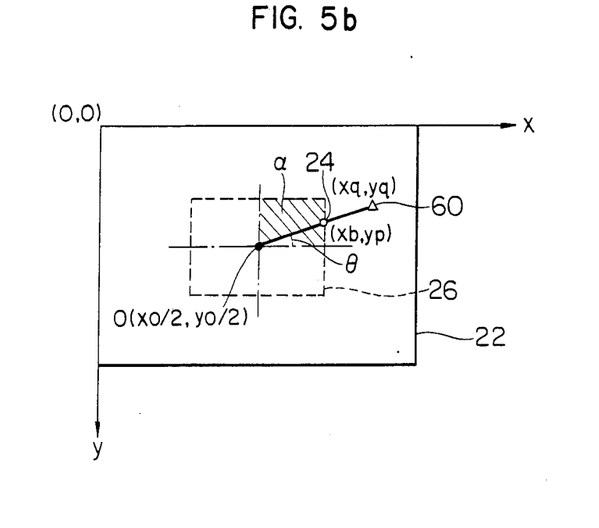

As shown in FIG. 5a, one method of obtaining an expected present position is to obtain a point 32 which lies on an extension line from a center point 0 (x0/2, y0/2) of a map display area 22 on the display screen and which is given in terms of a ratio m:n. Another method of obtaining this expected present position may be such that, as shown in FIG. 5b, an angle $\theta$ is obtained from the following expression in accordance with the center point 0 and the present position display point 24

$$\tan^{-1} \frac{y0/2 - yb}{xb - x0/2}$$

and then the expected present position is determined from the following expressions in accordance with a time h required for displaying a new map through map changing, an average vehicle speed V (this may be a predetermined value, e.g., 40 Km/h) and a distance d per dot on the display screen $$xq = xb + hV\cos\theta/d$$

$$yq = yp - hV\sin\theta/d$$

These expressions are applied to the case where the present position display point 24 is present in the hatched area $\alpha$ of FIG. 5b and it is needless to say that the similar expressions are used in cases where the display point 24 is present in any other area.

Then, a step 400 is performed to effect a map display process.

Figure 7A:
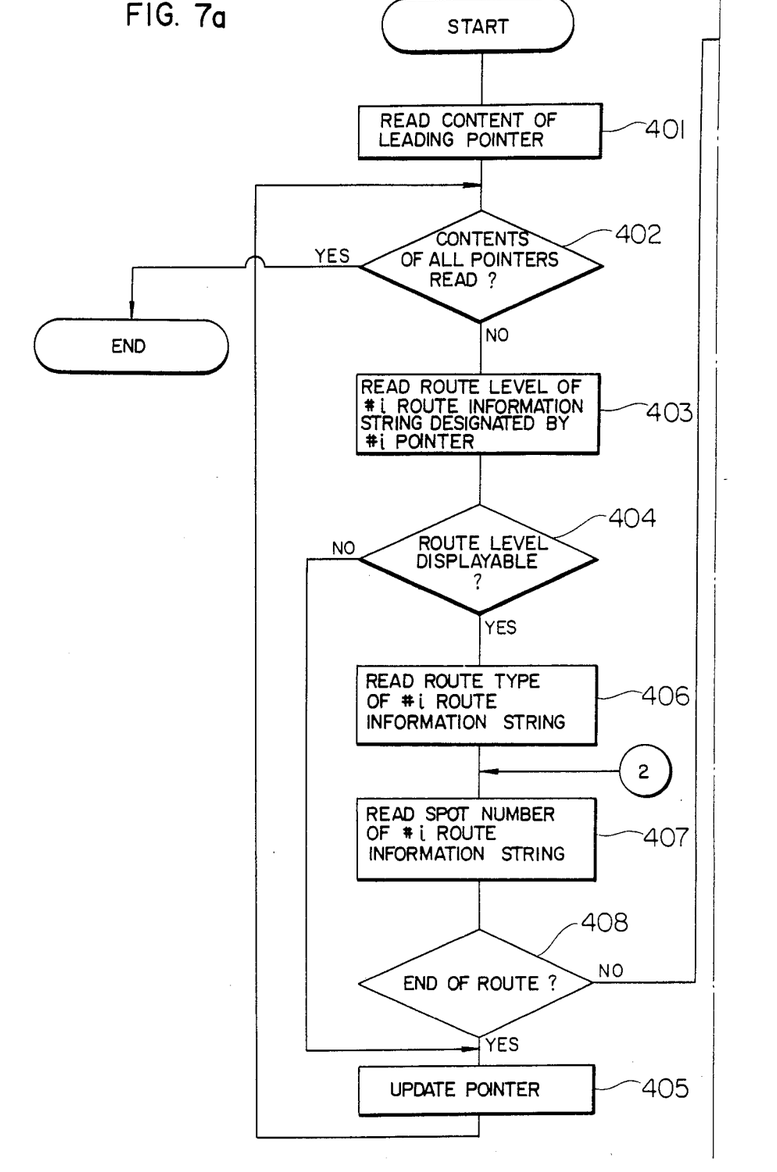
FIGS. 7a and 7b are a detailed flow chart of the step 400 in FIG. 3.
Figure 7B:
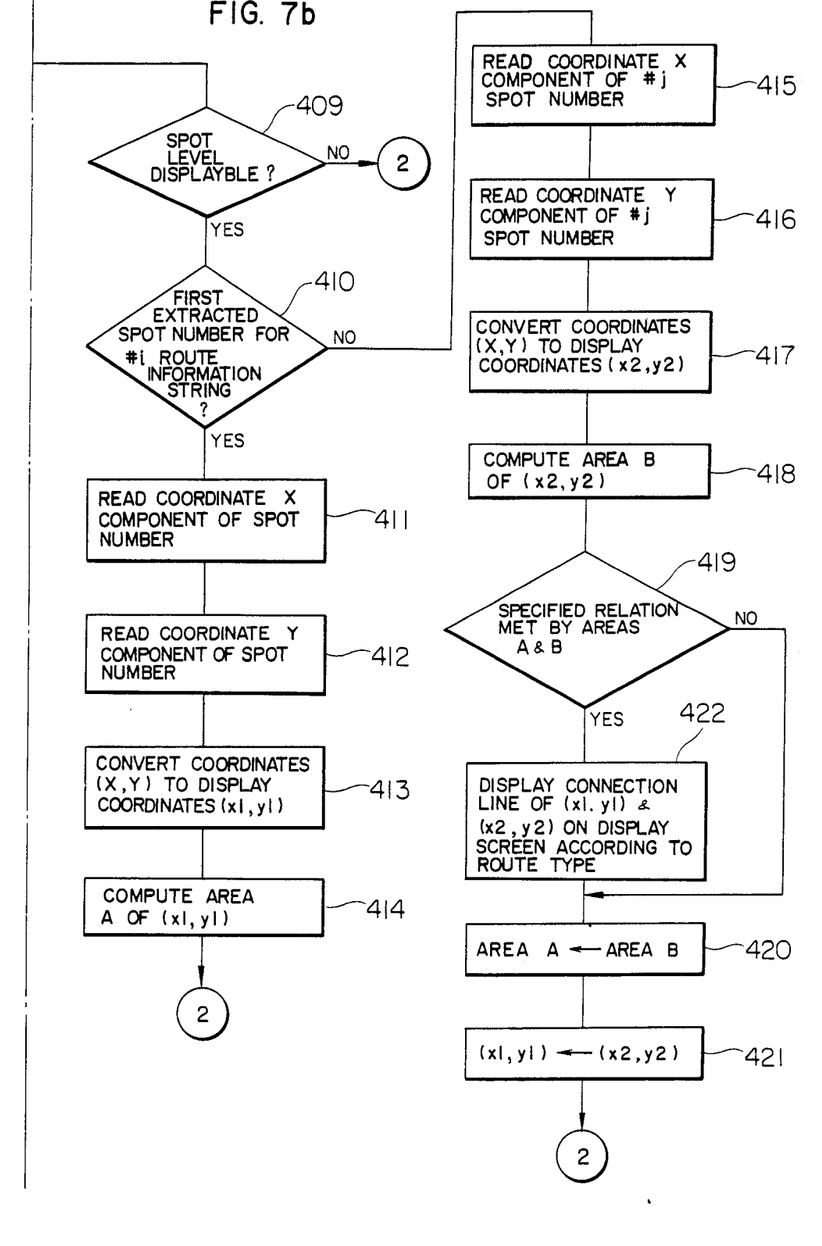

At the map display step 400, as shown in FIGS. 7a and 7b a step 401 is performed first thus reading the content of the leading pointer 581 of the route information string 48 in the map data storage medium 12.

Then, a step 402 is performed to determine whether the contents of all the pointers 581 to 58N have been read out.

Since this occurs just after the reading of the content of the leading pointer 581, the decision results in NO and then a step 403 is performed.

At the step 403, the route level information of the ith route information string (the first route information string 561) designated by the ith pointer (the leading pointer 581 at this time) is read out.

Then, a step 404 is performed to determine whether the route level is a display enable one, that is, whether the ith route (the first route) is one which must be displayed in accordance with the designated size.

If the ith route (the first route) needs not be displayed, a step 405 is performed so that the pointer is updated or the content of the next pointer (the second pointer 582) is read out and a return is made to the step 402.

On the other hand, if the ith route (the first route) must be displayed, then a step 406 is performed so that the route type information of the ith route information string (the first route information string 561) is read out.

Then, a step 407 is performed so that the spot number information (the leading spot number information at this time) of the ith route information string (the first route information string 561) is read out.

Then, a step 408 is performed to determine whether the end of route information of the ith route information string (the first route information string 561) has been read out.

Since this happens just after the reading of the leading spot number information, the decision results in NO and then a step 409 is performed to read the spot level information assigned to the spot number of the spot information string 46 which corresponds to the spot number concerned (the leading spot number) and thereby to determine whether the spot is a displayable one in accordance with the designated size as mentioned previously.

If the spot need not be displayed, then a return is made to the step 407 so that the next spot number of the ith route information string (the first route information string 561) is read out.

On the contrary, if the spot must be displayed, then a step 410 is performed to determine whether the spot number is one extracted for the first time for the ith route information string (the first route information string 561).

Since this is the first spot number at this time, the decision results in YES and then steps 411 to 414 are performed thereby reading the map coordinate X and Y components of the spot, converting the map coordinate point (X, Y) to a display coordinate point (x1, y1) and obtaining an area A to which the display coordinate point (x1, y1) belong.

Figure 6:
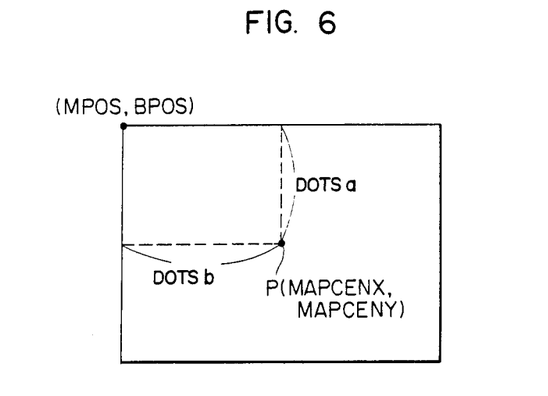
FIGS. 6, 8a, 8b, 9a and 9b are diagrams for explaining the processing of the step 400.

This coordinate conversion process is such that, as shown in FIG. 6, a point P (MPOS, BPOS) of the display coordinate system (x, y) corresponding to the coordinate origin (0, 0) is obtained from the following equations in accordance with a point P (MAPCENX, MAPCENY) of the map coordinate system corresponding to the present position display point 24 or the expected present position 32, the number of dots LDOT per unit X component, the number of dots ADOT per unit Y component and dot numbers a and b.

$$MPOS = MAPCENX - b/LDOT$$

$$BPOS = MAPCENY + a/ADOT$$

Figure 8A:
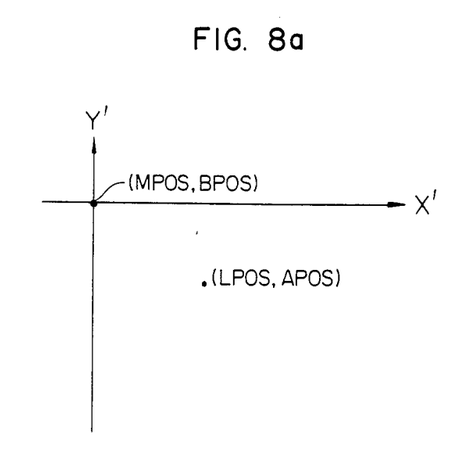
Figure 8B:
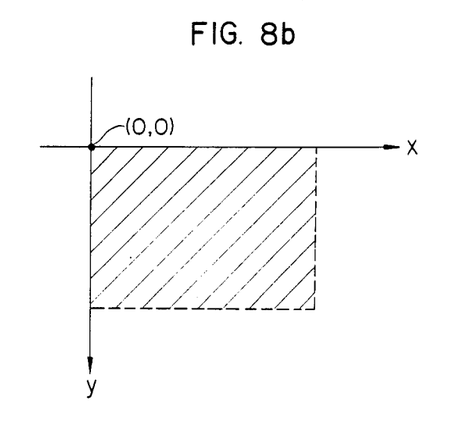

Then, as shown in FIG. 8a showing the map coordinate system and FIG. 8b showing the display coordinate system, in accordance with the thus obtained point (MPOS, BPOS) the map coordinates (LPOS, APOS) of the spot concerned are changed by coordinate conversion to the point (x1, y1) of the display coordinate system. The point (x1, y1) is obtained from the following equations $$x_1 = (LPOS - MPOS) \times LDOT$$

$$Y_L = (BPOS - APOS) \times ADOT$$

Figure 9A:
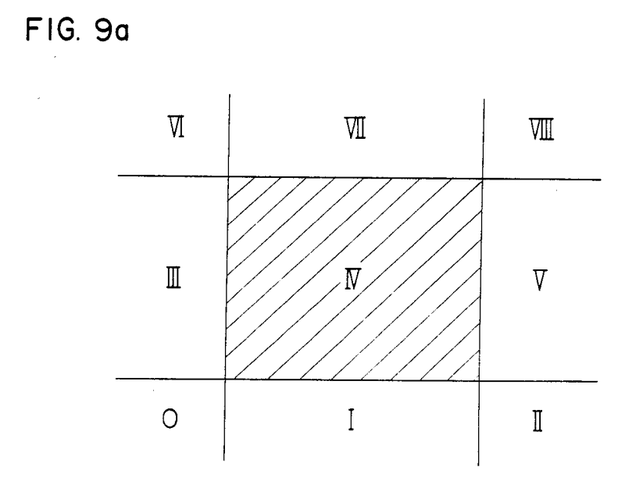

On the other hand, the previously mentioned area determining process is performed by determining whether the display coordinate point (x1, y1) obtained by the above-mentioned coordinate conversion process belongs to any one of the areas 0 to VIII divided as shown in FIG. 9a. In FIG. 9a, the area IV corresponds to the hatched area shown in FIG. 8b or the map display area.

After the determination at the step 414 of the area A to which the display coordinate point (x1, y1) belongs, a return is made to the step 407 so that the next spot number of the ith route information string (the first route information string 561) is read out.

Then, the step 408 is performed to determine whether the end of route information has been read out. If it is not, then the step 409 is performed to determine whether the spot level of the spot number is a display enable one. If it is not, a return is made to the step 407. If it is, then the step 410 is performed to determine whether this spot number is the one extracted for the first time for the ith route information string (the first route information string 561).

Since the first spot number has already been extracted by this time, the decision results in NO and then steps 415 to 419 are performed successively to effect the similar processes as the previously mentioned steps 411 to 415. In other words, the map coordinates of the current spot number (the jth spot number) are converted to the corresponding display coordinates (x2, y2) and also an area B to which the display coordinates (x2, y2) belong is determined.

Figure 9B:
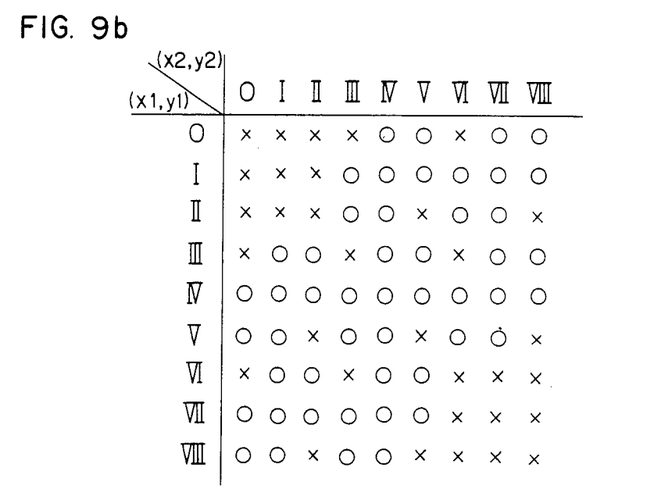

Then, a step 419 is performed to determine whether the connection between the point (x1, y1) and the point (x2, y2) should be displayed, that is, whether there is a specified relation between the areas A and B. This decision process is such that, as shown in FIGS. 9a and 9b, if the display coordinates (x1, y1) belong to the area 0 and the other display coordinates (x2, y2) belong to any one of the areas 0, I, II, III and VI, it is determined that there is no specified relation between the two. On the other hand, if the display coordinates (x1, y1) belong to the area 0 and the other display coordinates (x2, y2) belong to any one of the areas IV, V, VII and VIII, then it is determined that there exists the specified relation (this is indicated by a mark 0 in FIG. 9b). The states of the other combinations are also shown in FIG. 9b.

If there is no specified relation between the areas A and B, then steps 420 and 421 are performed so that an area updating process of changing the area B to the area A and a coordinate point updating process of changing the coordinates (x2, y2) to the coordinates (x1, y1) are performed and a return is made to the step 407.

On the other hand, if there is the specified relation between the areas A and B, then a step 422 is performed so that the connection between the point (x1, y1) and the point (x2, y2) is displayed on the display screen in accordance with the route type. In other words, if the ith route (the first route) is a national road, for example, the route is displayed with an increased brightness as compared with the other routes. Then, the steps 420 and 421 are performed thus effecting the area updating process and the coordinate point updating process and then a return is made to the step 407.

Thereafter, until the end of route of the ith route (the first route) is read out, the route including the steps 407, 408 and 409 and the route including the steps 407, 408, 409, 410 and 415 to 422 (the step 422 is eliminated as occasion demands) are performed selectively thus effecting the route display for the ith route (the first route).

When the end of route of the ith route (the first route) is read out, the decision of the step 408 changes to YES and then the step 405 is performed thus effecting the pointer updating process and thereby performing the desired processes for the next route (the second route) in the like manner as the processes for the first route.

Thereafter, the similar processes as mentioned above are successively performed on the respective route information strings so that when the processing of the Nth route information string 56N is ended, the step 402 determines that the contents of all the pointers have been read out and the processing shown in FIG. 7 is finished.

Figure 10:
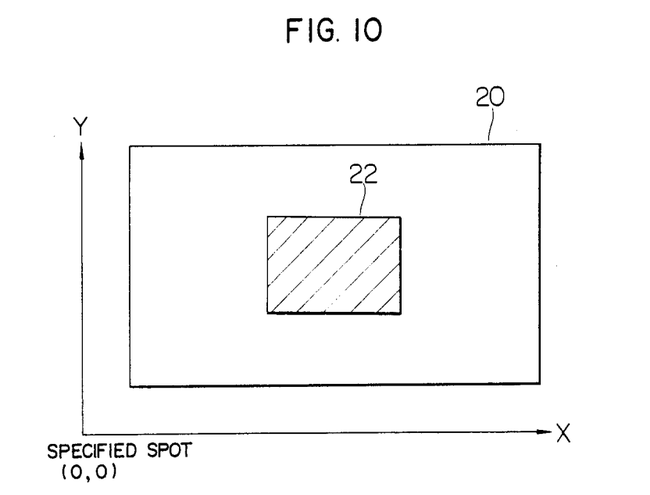
FIGS. 10 and 11a to 11c are diagrams for explaining a display method according to the invention.
Figure 11A:
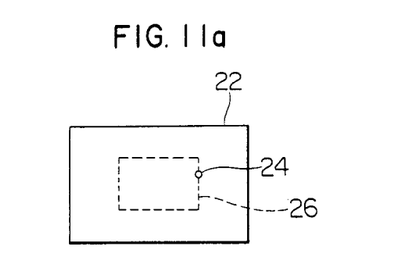
Figure 11B:
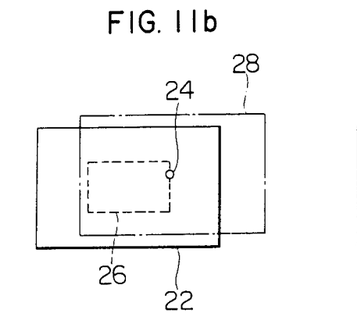
Figure 11C:
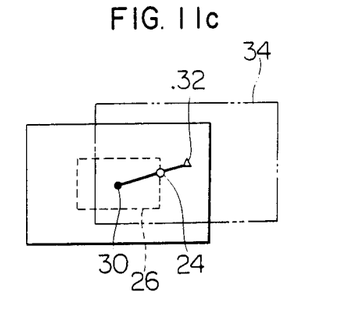

In accordance with the invention, as shown in FIG. 10, the map data storage medium 12 preliminarily stores the map forming spots of a general map 20 in the form of coordinate points with a specified spot (e.g., Tokyo) as a coordinate origin (0, 0) and also a map of a hatched area designated at numeral 22, for example, is displayed on the screen of the display 10. At this time, if the present position display point 24 reaches the map changing frame 26 as shown in FIG. 11a, a new display map 28 is displayed with the current present position display point 24 as the central point on the display screen as shown in FIG. 11b or alternatively a new map 34 is displayed with an expected present position 32 existing on the extension line from a displayed map center point 30 and the present position display point 24 as the newly displayed map center point as shown in FIG. 11c.

Figure 12:
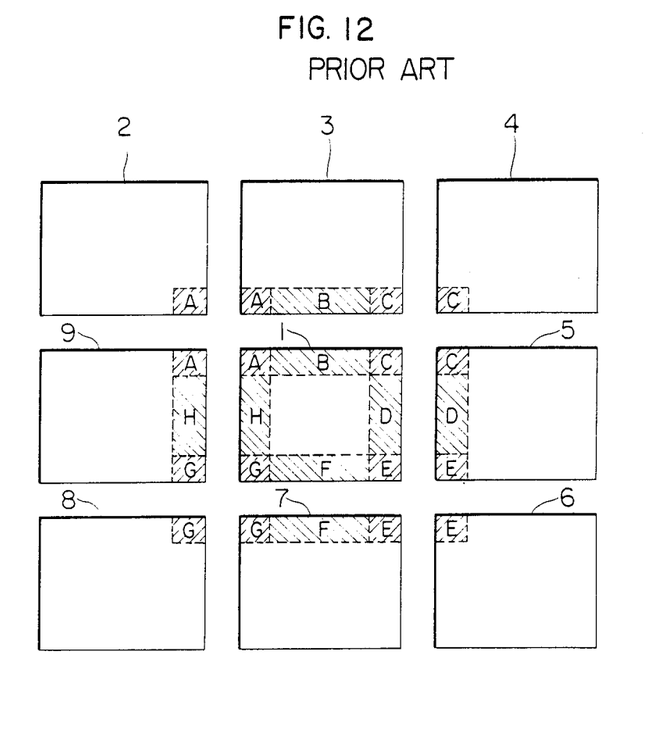
FIG. 12 shows diagrams for explaining the map data according to the prior art.

FIG. 12 shows the prior art in which the data portions of peripheral areas A, B, C, D, E and F in a map data 1 are arranged to overlap the other map data 2 to 9.

We claim:

1. A map display for vehicle in which in response to movement of a vehicle, a present position of the vehicle is successively computed to display the same on a map displayed on a display screen, said system comprising:
   a map data storage medium for preliminarily storing a plurality of spot coordinates representing map forming spots with a specified spot as a coordinate origin;
   storage means for preliminarily storing map changing frame indicative of display coordinates;
   means for comparing display coordinates of said present position with display coordinates of map changing frame;
   means for extracting spot coordinates to form a new map centering said present position from said map data storage medium by comparing spot coordinates of said present position with the spot coordinates in said map data storage medium in response to a decision of said comparing means that said present position has reached said map changing frame; and
   means for displaying said new map on display according to spot coordinates extracted by said extracting means.

2. A map display according to claim 1 wherein said comparing means carries out said comparing operation at every time when a predetermined time is lapsed.

3. A map display for vehicles in which a present position of a moving vehicle is successively computed and displayed on a map screen of a display, said system comprising:
   a map data storage medium for preliminarily storing a plurality of spot coordinates representing map forming spots with a specified spot being as a coordinate origin;
   storage means for preliminarily storing map changing frames indicative of display coordinates;
   means for comparing the display coordinates of said present position with the display coordinates of said map changing frame;
   means for computing an expected position of the vehicle from the present position thereof;
   means for extracting spot coordinates forming a new map and centering said expected position from said map data storage medium and for comparing the spot coordinates of said expected position with the spot coordinates of said map data storage medium when said comparing means decides that said present position has reached said map changing frame; and
   means responsive to the spot coordinates extracted by said extracting means for displaying said new map on the display.

4. A map display according to claim 3 wherein said comparing means carries out said comparing operation at every time when a predetermined time is lapsed.

5. A map display according to claim 3 wherein said computing means computes said expected position in a manner that it is defined as a position which is located on an extension line connecting a center point of said display with said present position and located on the line between said center point and said present position at a predetermined ratio.

6. A map display according to claim 3 wherein said computing means computes said expected position in a manner that it is defined as a position which is located on an extension line connecting a center point of said display with said present position and determined depending on the speed of the vehicle.

* * * * *